Patented Jan. 14, 1947

2,414,144

UNITED STATES PATENT OFFICE 2,414,144

SULFUR-MODIFIED UNSATURATED CELLULOSE ETHER AND PROCESS OF PRODUCING THE SAME

Maurice L. Ernsberger, Wilmington, Del., assignor to E. I. du Pont de Nemours & Company, Wilmington, Del., a corporation of Delaware No Drawing. Application December 14, 1943, Serial No. 514,285

15 Claims. (Cl. 260—232)

1

This invention relates to cellulose ethers. More particularly it relates to the vulcanization of unsaturated cellulose ethers and the products thus obtained.

Cellulose ethers have been widely used in many important applications such as films, fibers, molded articles and ingredients of lacquers and coating compositions. For many applications, properties such as resilience and high resistance to solvents, which cellulose ethers do not naturally possess to a great degree, are highly desirable. A variety of treatments have been proposed to modify cellulose ethers in such a way that they will possess these desirable properties. Improvements have been obtained in many instances, but they are often accompanied by objectionable changes such as embrittlement or loss of strength. Furthermore, in many instances the procedures previously proposed have involved technical difficulties and the use of expensive modifying agents.

This invention has as an object a new class of cellulose derivatives. Another object is the provision of a process for making the same. A further object is the provision of a process for the modification of cellulose ethers. An additional object is the provision of a process for increasing the solvent resistance, resilience and softening point of cellulose ethers. Other objects will appear hereinafter.

These objects are accomplished by the following invention wherein an unsaturated cellulose ether is heated at a temperature above 60° C. but below the decomposition temperature with sulfur, preferably in the presence of a vulcanization accelerator, until the product is substantially insoluble in solvents for the unmodified cellulose ether. The resulting vulcanized products, which are new and form a part of this invention, are characterized by increased resistance to solvents.

In carrying out the process of this invention in the preferred manner, the unsaturated cellulose ether is heated in the presence of 1% to 5% of an organic rubber vulcanization accelerator and 0.5% to 5% sulfur, based on the weight of the cellulose ether, at a temperature of 90° to 150° C. for 30 minutes to 5 hours. Preferably, cellulose ethers containing 0.05 or more unsaturated ether substituents per glucose unit are employed.

Unsaturated cellulose ethers suitable for use in this invention can be prepared by any of the several known processes for the preparation of cellulose ethers. For example, alkali cellulose can be reacted with unsaturated alkylating agents such as alkenyl halides or sulfates until the desired

2 degree of substitution is obtained. By reaction of alkali cellulose with a properly selected mixture of saturated and unsaturated alkylating agents, there can be obtained organic solvent-soluble mixed cellulose ethers having the desired degree of unsaturation. In an alternate procedure, a partially etherified cellulose can be further etherified with unsaturated and/or saturated alkylating agents. Any organic rubber accelerator can be used and either elemental sulfur or a sulfur-liberating compound, such as ammonium polysulfide or dibenzyl tetrasulfide, is operable.

The more detailed practice of the invention is illustrated by the following examples wherein parts given are by weight. There are, of course, many forms of the invention other than these specific embodiments.

EXAMPLE I

Crotylcellulose film (0.2 crotyl group per glucose unit) is prepared from the corresponding xanthate in a manner analogous to the preparation of regenerated cellulose film from viscose solution. The crotylcellulose film is impregnated with an aqueous solution containing 3% hexamethyleneimine dithiocarbamate and 1.5% sulfur (as ammonium polysulfide), dried at room temperature, and baked for 4½ hours at 155° C. The resulting film is insoluble in aqueous cuprammonium hydroxide even after tumbling for 24 hours. The original crotylcellulose film dissolves readily in cuprammonium hydroxide either before or after heating at 155° C. for 4½ hours in the absence of hexamethyleneimine dithiocarbamate and sulfur. Regenerated cellulose film prepared from the xanthate in the usual manner, remains soluble in cuprammonium hydroxide after treatment with the hexamethyleneimine dithiocarbamate and ammonium polysulfide solution and baking in a manner similar to that described above.

EXAMPLE II

Yarn from crotylcellulose containing 0.21 crotyl group per glucose unit is prepared by spinning a sodium hydroxide solution of the corresponding xanthate followed by regeneration in a manner analogous to the preparation of viscose rayon. Skeins of this yarn are treated with an aqueous solution containing 2% hexamethyleneimine dithiocarbamate and 5% sulfur (ammonium polysulfide is used as the source of sulfur), centrifuged so that the amount of treating solution retained is equal to 1.8 times the weight of the dry yarn, dried at room temperature and baked for 3 hours at 140° C. The resulting yarn has improved resilience, becomes insoluble in cuprammonium hydroxide as a result of this treatment, and is much less sensitive to aqueous alkali solutions than the original unvulcanized yarn. Similar results are obtained with yarn containing 0.03 to 0.4 crotyl group per glucose unit and with treating solutions containing from 0.5% to 5% of hexamethyleneimine dithiocarbamate and from 0.5% to 10% sulfur (as ammonium polysulfide). In place of hexamethyleneimine dithiocarbamate, other water-soluble organic rubber accelerators such as piperidinium pentamethylenedithiocarbamate can be used.

EXAMPLE III

Films of crotylcellulose (2.8 crotyl groups per glucose unit) are cast from a benzene-methanol (90-10) solution containing 4% zinc dibutyldithiocarbamate and 1.25% sulfur based on the crotylcellulose. The resulting film is heated for one hour at 100° C. In addition to being insoluble in organic solvents, e. g., benzene, dioxan, ethyl acetate and ethanol and extremely resistant to hot alkali solutions, the vulcanized film remains clear and pliable and shows increased tenacity and elongation and improved flex durability. Properties of films of the unmodified and vulcanized crotylcellulose are compared in the following table:

*Table I*

| Film | Tensile strength, lbs. per sq. in. | Per cent elongation | Flexor number |
|---|---|---|---|
| Original | 800 | 17 | 145 |
| Vulcanized | 880 | 58 | 283 |

The flex durability values are obtained with a Pfund flexor. In this apparatus a test portion of film ½ inch x 2 inches in dimensions and approximately 0.003 inch thick is clamped by the ends in two metal clamps approximately ½ inch apart. One of these clamps is movable so that it can be pressed up against the other with the test film between them and with the folded edge of the film extending approximately 0.05 inch beyond the edge of the clamp. In this manner the film is bent through a radius of about 0.025 inch, but pressure from the clamps is not applied directly on the fold. The movable clamp is pulled back and then pulled up to the fixed clamp again with the film bent on the opposite side. This flexing in opposite directions is continued until the film cracks. The number of folds which the film requires to be broken is recorded as the flexor number.

Insoluble products are also obtained when the same crotylcellulose is heated at a temperature in the range of 60° to 130° C. in the presence of 0.5% to 5% zinc dibutyldithiocarbamate or some other organic rubber accelerator such as hexamethyleneimine dithiocarbamate, 2-mercaptothiazoline, mercaptobenzothiazole, or zinc diethyldithiocarbamate and from 0.2% to 10% sulfur.

Insoluble products are also obtained by heating the crotylcellulose in the presence of 0.2% to 10% sulfur in the absence of an accelerator. However, at a given temperature in the range of 80° to 175° C. a longer time is required for vulcanization and the resulting vulcanizates are not as satisfactory as those prepared, as described above, in the presence of an accelerator.

EXAMPLE IV

Films of crotylethylcellulose (0.8 crotyl and 1.6 ethyl groups per glucose unit) containing 4% zinc dibutyldithiocarbamate and 1.25% sulfur are cast from benzenemethanol (90-10) solution, in which all of the ingredients are soluble. Upon heating at 100° C. for one hour, clear, flexible films which are insoluble in benzene result. Improved properties are also obtained when the same crotylethylcellulose is heated at a temperature in the range of 80° to 170° C. in the presence of 0.5% to 5% zinc dibutyldithiocarbamate and from 0.5% to 5% sulfur until the desired degree of modification is obtained. Other organic solvent-soluble unsaturated cellulose ethers, for example those containing 1.0 crotyl and 1.4 ethyl groups, 1.3 crotyl and 0.9 ethyl, or 1.1 methallyl and 1.8 ethyl groups per glucose unit also become insoluble in organic solvents when heated at 100° C. for two hours in the presence of 4% zinc dibutyldithiocarbamate and 1.25% sulfur.

EXAMPLE V

Methallylcellulose (0.66 methallyl group per glucose unit) fibers, prepared by the heterogeneous etherification of cotton fibers with methallyl chloride in the presence of alkali, is impregnated with an aqueous solution containing 2% hexamethyleneimine dithiocarbamate and 10% sulfur as ammonium polysulfide, centrifuged to remove excess solution, dried at room temperature, and baked at 140° C. for one hour. The resulting vulcanized fibers are more resilient than the original material and insoluble in aqueous cuprammonium hydroxide.

The several variables involved in the vulcanization of unsaturated cellulose ethers are interdependent so that the desired result may be obtained under a wide variety of conditions. For example, a high degree of unsaturation, elevated temperatures, and active accelerators are all conducive to bringing about insolubilization in a short period of time. The individual variables are discussed below.

Any unsaturated cellulose ether is suitable for use in this invention. Preferably the unsaturated cellulose ether contains at least 0.05 unsaturated ether substituent per glucose unit. Among the suitable ethers may be mentioned crotylethylcellulose, crotylcellulose, methallylmethylcellulose, allylethylcellulose, crotylbenzylcellulose, ethylbenzylcrotylcellulose, pentadienylmethylcellulose, hydroxyethylcrotylcellulose, ethylhexadienylcellulose, etc.

A preferred embodiment of this invention is that in which an organic solvent-soluble unsaturated cellulose ether is used. The sulfur and rubber accelerators are conveniently incorporated in these unsaturated cellulose ethers through the use of a common solvent to give products which are more readily vulcanized than those prepared from unsaturated cellulose ethers which are insoluble in organic solvents. In addition, the vulcanizates prepared from organic solvent-soluble products have far more desirable properties than those prepared from the unsaturated cellulose ethers which are insoluble in organic solvents. The unsaturated ether substituents preferably contain up to six carbon atoms, which group includes the preferred methallyl and crotyl ethers. Where a mixed ether containing saturated and unsaturated ether substituents is to be employed, the saturated ether substituent is preferably the ethoxy group. These readily obtainable cellulose derivatives lend themselves readily to insolubilization through vulcanization treatments. The organic solvent-soluble unsaturated cellulose ether preferably contains at least one unsaturated ether substituent per five glucose units. These cellulose ethers are more readily vulcanized than those having a lower degree of unsaturation and yield more solvent-resistant vulcanizates.

Any organic rubber accelerator may be used, specific examples of which include, in addition to those already mentioned, 3,5-dimethylcyclohexanonethioisoxime, tetramethylthiuram disulfide, pentamethylenethiuram tetrasulfide, etc. The zinc dialkyldithiocarbamates are preferred accelerators since they are especially effective in bringing about insolubilization quickly at a relatively low temperature to give tough, pliable vulcanizates. The sulfur used in the vulcanization may be in the form of elemental sulfur or it may be supplied by a compound which is capable of liberating sulfur under the vulcanization conditions. Such sulfur-giving compounds are for example ammonium polysulfide, dibenzyl tetrasulfide and certain accelerators such as pentamethylenethiuram tetrasulfide, etc. Use of a sulfur-liberating compound is very often advantageous, particularly when the sulfur is introduced through the use of a common solvent, since sulfur may not be sufficiently soluble in the solvent used to dissolve or impregnate the cellulose ether.

In general, excellent results are obtained by using between 0.5% and 10% of sulfur based on the cellulose ether and from 0.5% to 6% by weight of the vulcanization accelerator. Preferably two to five per cent of the accelerator and from one to four per cent sulfur, based on the unsaturated cellulose ether, are used. Tough, insoluble vulcanizates are obtained using these proportions of vulcanizing agents. The vulcanization ingredients can be incorporated into the cellulose ether by means of a common solvent or by impregnating the cellulose ether with a swelling agent containing the vulcanization ingredients. It is, of course, also possible to carry out the vulcanization by first milling the dry ingredients with the cellulose ether and then heating.

Below 60° C. vulcanization is impracticably slow. The vulcanization temperature should preferably be above 80° C. and the preferred range is between 85° and 140° C., although higher temperatures can be used provided they do not decompose the cellulose ether. At lower temperatures the vulcanization proceeds slowly and at much higher temperatures there is danger of overcuring the product with a resulting loss of toughness. The vulcanization time depends largely on the temperature used and may vary from five minutes to 48 hours or even longer. A good criterion for vulcanization is the insolubility of the treated cellulose ether in a solvent in which it was originally soluble. The herein proposed combination of sulfur and an organic rubber accelerator has been found to be ideally adapted for the treatment of cellulose ethers because it is much more effective than sulfur alone and does not bring about the objectionable degradation caused by such agents as sulfur chloride, which liberate acidic materials having a detrimental effect on the cellulose ethers. Furthermore, vulcanization with sulfur and an accelerator yields insoluble products having good aging characteristics while in contrast unsaturated cellulose ethers insolubilized by previously proposed procedures gradually become brittle.

The above description and examples are intended to be illustrative only. Any modification or variation therefrom which conforms to the spirit of the invention is intended to be included within the scope of the claims.

What is claimed is:

1. A sulfur modified crotylcellulose insoluble in aqueous cuprammonium hydroxide solution and having been prepared by the process of claim 11.

2. A sulfur modified methallylcellulose insoluble in aqueous cuprammonium hydroxide solution and having been prepared by the process of claim 11.

3. A sulfur modified unsaturated cellulose ether insoluble in solvents for the unmodified ether said ether having been prepared by the process of claim 6.

4. A modified unsaturated cellulose ether of increased solvent resistance and resilience and of elevated softening point obtained by heating an unsaturated cellulose ether to a temperature of 85° to 140° C. with from 1% to 4% sulfur in the presence of 2% to 5% of a rubber vulcanization accelerator.

5. A modified unsaturated cellulose ether of increased solvent resistance and resilience and of elevated softening point obtained by heating an unsaturated cellulose ether to a temperature of 85° to 140° C. with from 1% to 4% sulfur.

6. Process for increasing the solvent resistance and resiliency and elevating the softening point of an unsaturated cellulose ether which comprises heating said ether at a temperature above 60° C. with sulfur until the product is substantially insoluble in solvents for the unmodified ether.

7. Process for increasing the solvent resistance and resiliency and elevating the softening point of an unsaturated cellulose ether containing at least one unsaturated ether group per five glucose units in the ether which comprises heating said ether at a temperature above 60° C. with sulfur until the product is substantially insoluble in solvents for the unmodified ether.

8. Process for increasing the solvent resistance and resiliency and elevating the softening point of an unsaturated cellulose ether containing at least one unsaturated ether group per five glucose units in the ether which comprises heating said ether at a temperature above 60° C. with sulfur and a rubber vulcanization accelerator until the product is substantially insoluble in solvents for the unmodified ether.

9. Process for increasing the solvent resistance and resiliency and elevating the softening point of an unsaturated cellulose ether containing at least one unsaturated ether group per five glucose units in the ether which comprises heating said ether at 85° to 140° C. with sulfur and a rubber vulcanization accelerator until the product is substantially insoluble in solvents for the unmodified ether.

10. Process for increasing the solvent resistance and resiliency and elevating the softening point of an unsaturated cellulose ether containing at least one unsaturated ether group per five glucose units in the ether which comprises heating said ether at 85° to 140° C. with sulfur and a zinc dialkyldithiocarbamate until the product is substantially insoluble in solvents for the unmodified ether.

11. Process for increasing the solvent resistance and resiliency and elevating the softening point of an unsaturated cellulose ether containing at least one unsaturated ether group per five glucose units in the ether which comprises heating said ether at 85° to 140° C. with from 1% to 4%, based on the ether, of sulfur and from 2% to 5%, based on the ether, of a zinc dialkyldithiocarbamate.

12. Process of claim 11 wherein the ether is a crotylcellulose.

13. Process of claim 11 wherein the ether is a methallylcellulose.

14. Process which comprises heating at 85° to 140° C. a crotylcellulose having at least one crotyl group per glucose unit of the ether with 1% to 4% of sulfur and 2% to 5% of zinc dibutyldithiocarbamate, both based on the ether, until the ether is insoluble in organic solvents for the untreated ether.

15. Process which comprises heating at 85° to 140° C. a methallylcellulose having at least one methallyl group per glucose unit of the ether with 1% to 4% of sulfur and 2% to 5% of zinc dibutyldithiocarbamate, both based on the ether, until the ether is insoluble in organic solvents for the untreated ether.

MAURICE L. ERNSBERGER.